Patented Feb. 15, 1938

2,108,643

UNITED STATES PATENT OFFICE 2,108,643

GREASE

Lawrence C. Brunstrum, Chicago, Ill., and Elmer Wade Adams, Hammond, Ind., assignors to Standard Oil Company, Chicago, Ill., a corporation of Indiana No Drawing. Application December 31, 1935, Serial No. 57,062

10 Claims. (Cl. 87—9)

This invention relates to certain new and novel greases and constituents for greases. More particularly, it relates to improved greases of the type known as cup greases.

It is an object of the invention to provide a grease, particularly a grease of the cup grease type which is free from "leaking" difficulties or, in other words, a grease in which none of the oil will separate out in storage. It is a further object of the invention to provide a grease, particularly a grease of the cup grease type, suitable for use at temperatures much higher than those at which prior art greases of this type can be used successfully. Another object of the invention is to provide a grease which will not break down or separate on being subjected to high temperatures and to repeated heating and cooling. A further object is to provide a grease which will not contribute to the failure of bearings in which it is used at any temperature short of the temperature at which the grease commences to burn or carbonize. A still further object of the invention is to provide a grease, particularly a grease of the cup grease type, which will not separate to any appreciable extent on cooling from high temperatures and which will not form hard gum-like soapy masses which contribute to bearing failure. Further and more detailed objects of the invention will become apparent as the description thereof proceeds.

The ordinary lime soap greases commonly known as cup greases are of great utility and are usually the most important products of a typical grease works. One reason for their wide application is their smooth consistency and the fact that this consistency remains a constant after a certain amount of working takes place so that the grease does not continue to lose consistency on further working. In spite of these and other advantages of ordinary cup greases, they have had certain serious disadvantages which very greatly limited their applicability.

One of these disadvantages is the tendency of these greases to "leak". In other words some of the oil tends to separate out from the grease on prolonged storage.

Another disadvantage of ordinary cup greases is their tendency to break down or separate on heating to high temperatures or on cooling from high temperatures. This separation results in the loss of most of the oil and in the precipitation of hard gum-like soap-containing masses which have practically no lubricating value and which in fact actually contribute to the failure of the bearing on which the grease is used. Thus, in the past, it has been considered impracticable to use cup greases above temperatures ranging from 160° F to about 175° F. on ordinary bearings. This temperature depends somewhat on the concentration of soap in the particular grease used, the maximum safe operating temperature increasing with the soap content. With very high soap contents, say 25–35% and with special soaps made from acids split from hydrogenated fats by certain recently developed high temperature processes it is sometimes possible to raise the upper limit to 190–220° F., but such high limits have been the exception rather than the rule. For use on ball bearings, and similar high pressure bearings, ordinary cup greases are limited to still lower temperatures, the maximum safe operating temperatures being about 40° F. lower than those above given for ordinary bearings.

These and other disadvantages of the prior art cup greases have been overcome by the present invention in which a small amount of a novel type of stabilizing agent is incorporated in the grease. These new stabilizing agents when present in small percentage, for instance from 3% to 6% in an ordinary cup grease, will effectually prevent leakage and will prevent or retard separation at high temperatures. These greases can be used at temperatures as high as 300° F., 400° F. or even 450° F., depending somewhat on the viscosity of the oil being used, without separating material which will produce bearing failure. The grease may liquefy at these higher temperatures and the oil viscosity may be too low for effective lubrication, but these new greases do not in any way contribute to bearing failure as do those of the prior art. However, it is preferred to use these greases at normal operating temperatures below about 250° F. Instead of separating to form hard soapy masses from which the oil is rapidly lost and which produce bearing failure, these new greases retain their homogeneity even up to the temperatures at which they begin to burn or carbonize. On cooling from high temperatures they likewise retain their homogeneity, or if separating at all, separate only to a slight extent producing slightly murky appearance, rather than separating out a hard soap-containing mass.

The substances which we find to produce these highly desirable results are in particular the oil-soluble high molecular weight alcohols. It is essential that the alcohol chosen have an appreciable oil solubility. No oil-insoluble alcohol which has been tried is satisfactory and no oil-soluble alcohol which has been tried is without effect. It is also essential that the alcohol chosen have a boiling point above, and preferably considerably above, the maximum temperature at which the grease is to be used. Alcohols boiling above 200° F. and preferably above 250° F. are recommended.

The monohydric alcohols are by far the most suitable and the normal monohydric alcohols are preferred.

While n-propanol can be used, n-butanol and alcohols of still higher boiling points and molecular weights are preferred.

Alcohols corresponding to the fatty acids are very satisfactory stabilizing agents. Oleic alcohol is one prominent example. Alcohols corresponding to other fatty acids, for instance, stearic, palmitic and arachidic acids can be used.

While it is possible to obtain very striking results by the use of these new stabilizing agents we find that these results can only be obtained by controlling the amount used within certain critical limits. These critical limits vary to some extent with the viscosity of the oil used in the grease and with the amount of soap used in the grease.

For typical greases the optimum amount of alcohol stabilizing agent usually lies within the range from about 1% to about 8% of the weight of the finished grease or preferably from about 3% to about 6% of the weight of the finished grease. If too little of the stabilizing agent is used it fails to prevent leakage and separation and the desired results are therefore not obtained. If, on the other hand, too large an amount is used, the finished grease becomes murky on cooling from high temperatures or, in extreme cases, even separates on cooling. Furthermore, the maximum amount of stabilizing agent must be closely controlled since the stabilizing agent is not a stiffening agent but actually tends to thin the resulting grease quite markedly so that in order to secure the same stiffness when using the stabilizing agent as without it, it is necessary to increase the soap content.

The greases embodying the present invention can suitably be made in accordance with the ordinary cup grease practice, or in pressure kettles, the stabilizing agent being added at the end of the otherwise conventional manufacturing operation but prior to final cooling. Thus, for instance, these greases may suitably be made by mixing the necessary lime with a small amount of water, and an amount of oil about equal to the fatty acid to be used in a steam-jacketed grease mixing kettle. The fatty acid to be used in the manufacture of the soap is then added and heat is applied. After an interval of about 40 to 60 minutes, when the temperature has reached 240–260° F., the soap is ready for mixing. About 2% to 3% of water is added, and when the batch foams up it is driven down by the addition of oil, the heat being abstracted by the addition of cold oil and by the vaporization of water so that the temperature drops to about 230° F. Oil is added until the batch contains about 25% soap, and during this interval the temperature drops gradually until it reaches about 205–210° F. If the desired soap percentage is about 15, the batch should reach a temperature of about 180–190° F. at this point. This process is about the same when fats are used instead of fatty acids except that it requires 12 to 20 hours at 240–260° F. to effect the saponification of the fats. After the addition of the final amount of oil, but prior to final cooling, the desired amount of stabilizing agent is added and stirred in and the grease is then cooled and packaged in the normal manner.

While it is preferable in some respects to manufacture these greases in accordance with the conventional cup grease practice in which a small amount of water, say from one-half to one and one-half percent, is left in the finished grease it is also possible to make our greases in a completely anhydrous form by boiling off all the water. In manufacturing the anhydrous greases, it is necessary to cool the grease rapidly in order to secure the desired structure. This can be done by the use of cooling coils, or chilled rolls or by pouring the hot grease out in layers of, preferably, not over about one inch in thickness at ordinary atmospheric temperatures. The result is a crystal clear grease, which like those containing water, will not separate at high temperatures. These anhydrous greases have some marked advantages but do not have the conventionally desirable structure and properties of the hydrous greases.

The use of these stabilizing agents is particularly valuable in connection with ordinary cup greases, i. e., calcium soap greases. It is preferable to use calcium hydrogenated fatty acid soap but calcium animal fatty acid soap and other calcium soaps are completely satisfactory. Relatively small amounts of soaps of other metals can be used along with the calcium soap, for instance, sodium soap, or the stabilizing agents may be used in greases which do not contain calcium soaps at all, for example, zinc soap greases. However, in these cases the effect is much less marked and the results are less desirable than in the case of calcium soap greases.

The greases made in accordance with this invention will normally have the following weight composition:

|  | Per cent | Per cent |
|---|---|---|
| Lubricating oil | 54–96 | or preferably 67–92 |
| Soap | 3–35 | or preferably 5–25 |
| Stabilizing agent | 1–8 | or preferably 3–6 |
| Water | 0–3 | or preferably 0–2 |

However, relatively inert materials such as powdered metals, flake graphite, mica, asbestos fibers, small amounts of glycerine, fats, etc, can be included without departing from the spirit of this invention and these relatively inert materials are not to be included in figuring the composition of the grease.

As examples of this invention greases have been made using five different alcohol stabilizing agents, the grease in each case having the following composition: 22.5% calcium soap of fatty acids split from hydrogenated fats, 73.5% red oil (Mid-Continent distillate having a viscosity of about 300 seconds Saybolt at 100° F.), and 4% stabilizing agent.

The stabilizing agents used in the above composition were n-propanol, n-butanol, n-amyl alcohol, cetyl alcohol and ocenol (the latter being a proprietary higher alcohol). These various compositions were free from leakage after storage of two months or more and exhibited very favorable properties as to high temperature stability. These particular compositions were anhydrous. As previously indicated, greases superior in some respects can be made leaving a small amount of water in the finished grease.

While this invention has been described in connection with certain specific embodiments and in connection with certain theories, it is to be understood that these are given by way of illustration only and not by way of limitation. The appended claims should be construed as broadly as the prior art will permit.

We claim:

1. A calcium soap grease stabilized against the separation of soap or oil and containing not to exceed about 3% of water comprising as a stabilizing agent from about 1% to about 8% of an oil-soluble monohydric alcohol boiling above 200° F.

2. A calcium soap grease stabilized against the separation of soap or oil and containing not to exceed about 3% of water comprising as a stabilizing agent from about 1% to about 8% of an oil-soluble monohydric alcohol boiling above 250° F.

3. A substantially anhydrous calcium soap grease stabilized against the separation of soap or oil by the addition thereto of from about 3% to about 6% of an oil-soluble monohydric alcohol boiling above 200° F.

4. A substantially anhydrous calcium soap grease stabilized against the separation of soap or oil by the addition thereto of from about 3% to about 6% of an oil-soluble monohydric alcohol boiling above 250° F.

5. A calcium soap grease having approximately the following composition by weight:

| | Per cent |
|---|---|
| Lubricating oil | 54–96 |
| Soap | 3–35 |
| Stabilizing agent | 1–8 |
| Water | 0–3 | in which said stabilizing agent is an oil-soluble monohydric alcohol boiling above 200° F.

6. A calcium soap grease having approximately the following composition by weight:

| | Per cent |
|---|---|
| Lubricating oil | 54–96 |
| Soap | 3–35 |
| Stabilizing agent | 1–8 |
| Water | 0–3 | in which said stabilizing agent is an oil-soluble monohydric alcohol boiling above 250° F.

7. A calcium soap grease having approximately the following composition by weight:

| | Per cent |
|---|---|
| Lubricating oil | 67–92 |
| Soap | 5–25 |
| Stabilizing agent | 3–6 |
| Water | 0–2 | in which said stabilizing agent is an oil-soluble monohydric alcohol boiling above 200° F.

8. A calcium soap grease having approximately the following composition by weight:

| | Per cent |
|---|---|
| Lubricating oil | 67–92 |
| Soap | 5–25 |
| Stabilizing agent | 3–6 |
| Water | 0–2 | in which said stabilizing agent is a normal monohydric alcohol having a molecular weight at least as great as that of propanol, boiling above 200° F. and having an appreciable oil solubility.

9. A calcium soap grease having approximately the following composition by weight:

| | Per cent |
|---|---|
| Lubricating oil | 67–92 |
| Soap | 5–25 |
| Stabilizing agent | 3–6 |
| Water | 0–2 | in which said stabilizing agent is a normal monohydric alcohol having a molecular weight at least as great as that of butanol, boiling above 200° F. and having an appreciable oil solubility.

10. A calcium soap grease having approximately the following composition by weight:

| | Per cent |
|---|---|
| Lubricating oil | 67–92 |
| Soap | 5–25 |
| Stabilizing agent | 3–6 |
| Water | 0–2 | in which said stabilizing agent is a fatty alcohol boiling above 200° F. and having an appreciable oil solubility.

LAWRENCE C. BRUNSTRUM.
ELMER WADE ADAMS.